United States Patent [19]
Sledge

[11] Patent Number: 6,115,955
[45] Date of Patent: Sep. 12, 2000

[54] INTERCHANGEABLE SYSTEM FOR FISHING RODS

[76] Inventor: Leroy Sledge, 5505 Jesters La., Peoria, Ill. 61614

[21] Appl. No.: 09/397,769

[22] Filed: Sep. 16, 1999

Related U.S. Application Data

[60] Provisional application No. 60/101,732, Sep. 24, 1998.

[51] Int. Cl.[7] .................................................. A01K 87/00
[52] U.S. Cl. .................................................. 43/18.1; 43/23
[58] Field of Search ................................. 43/18.1, 22, 23

[56] References Cited

U.S. PATENT DOCUMENTS

| | | | |
|---|---|---|---|
| D. 407,791 | 4/1999 | Ohmura | D22/142 |
| 1,595,275 | 8/1926 | White | 43/18.1 |
| 2,018,923 | 10/1935 | Potter | 43/23 |
| 2,232,107 | 2/1941 | Gall | 43/25 |
| 3,073,055 | 1/1963 | Edwards et al. | 43/23 |
| 3,121,290 | 2/1964 | Brown | 43/18.1 |
| 3,468,052 | 9/1969 | Hardesty et al. | 43/23 |
| 3,975,855 | 8/1976 | McKeown | 43/23 |
| 4,067,133 | 1/1978 | Livingston | 43/18.1 |
| 4,398,369 | 8/1983 | Wiebe | 43/18.1 |
| 4,467,548 | 8/1984 | Tabor | 43/23 |
| 4,648,196 | 3/1987 | Moody | 43/23 |
| 4,738,046 | 4/1988 | Fraylick et al. | 43/18.1 |
| 4,903,427 | 2/1990 | Yamato | 43/22 |
| 5,012,607 | 5/1991 | Meschkat | 43/25 |
| 5,259,140 | 11/1993 | Epperson | 43/18.1 |
| 5,263,275 | 11/1993 | Rumbaugh | 43/23 |
| 5,291,683 | 3/1994 | Yamato | 43/22 |
| 5,317,829 | 6/1994 | Balkcom | 43/23 |
| 5,355,611 | 10/1994 | Dahlberg et al. | 43/21.2 |
| 5,535,539 | 7/1996 | Vetre | 43/23 |
| 5,974,722 | 11/1999 | Kiser | 43/18.1 |

FOREIGN PATENT DOCUMENTS

| | | | |
|---|---|---|---|
| 1409246 | 7/1965 | France | 43/22 |
| 2554680 | 5/1985 | France . | |
| 2256306 | 6/1973 | Germany . | |
| 8-154540 | 6/1996 | Japan . | |
| 10-248446 | 9/1998 | Japan . | |
| 1078570 | 8/1967 | United Kingdom | 43/23 |
| 2032743 | 5/1980 | United Kingdom . | |
| 2131261 | 6/1984 | United Kingdom . | |
| 2157531 | 10/1985 | United Kingdom . | |
| 2216373 | 10/1989 | United Kingdom . | |

*Primary Examiner*—Michael J. Carone
*Assistant Examiner*—Darren W. Ark
*Attorney, Agent, or Firm*—Richard C. Litman

[57] ABSTRACT

A fishing rod assembly with interchangeable handle components permits different reels, different counterweights or counterweight amounts, and even different rod blank assemblies, to be assembled and used interchangeably with one another for different types of fishing (fly casting, spinning, trolling, etc.) as desired. The handle assembly includes a threaded sleeve which is used to secure various collars and different types of reels thereto. A finger grip or trigger may be installed using these components to provide better casting for certain types of fishing. The rod blank passes through a closely fitting axial passage through the handle assembly, with the butt end of the rod blank assembly protruding slightly from the butt end of the handle assembly. The butt end of the rod blank includes an attachment fitting for a counterweight assembly, with different counterweight assemblies being interchangeably installable to the butt end of the rod blank and handle, or different amounts of weight being interchangeably installable within the counterweight assembly. The rod blank also includes a fitting immovably affixed to the portion adjacent the front of the handle assembly when the rod blank is installed therein, with the fitting mating with a cooperating socket in the front end of the handle assembly to preclude relative axial rotation between the rod blank and the handle assembly when the components are secured together.

15 Claims, 2 Drawing Sheets

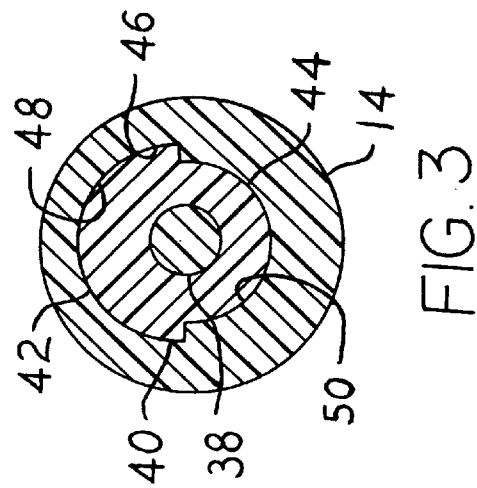
FIG. 3
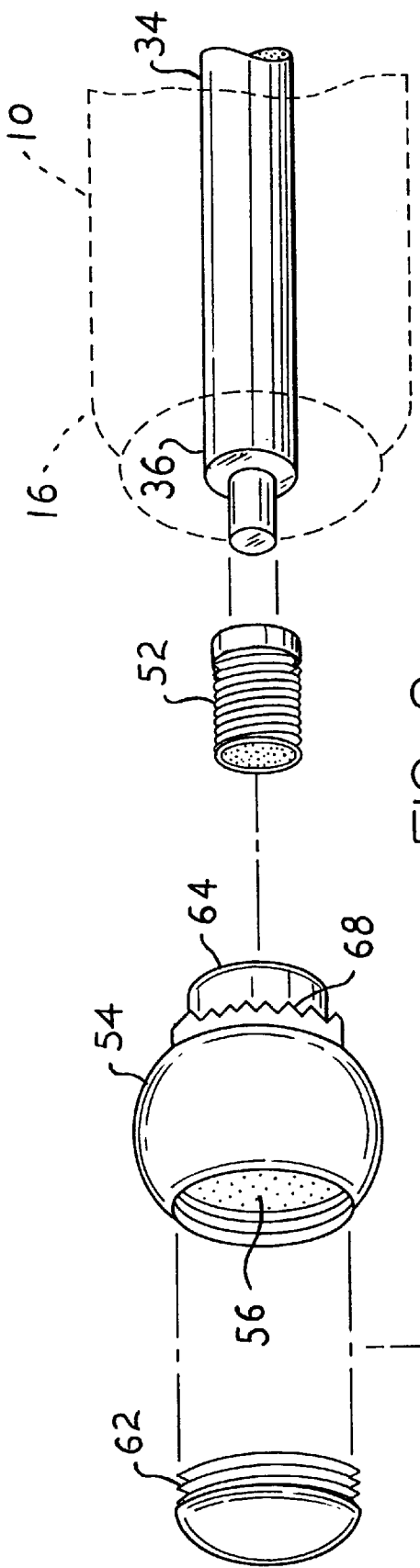
FIG. 2
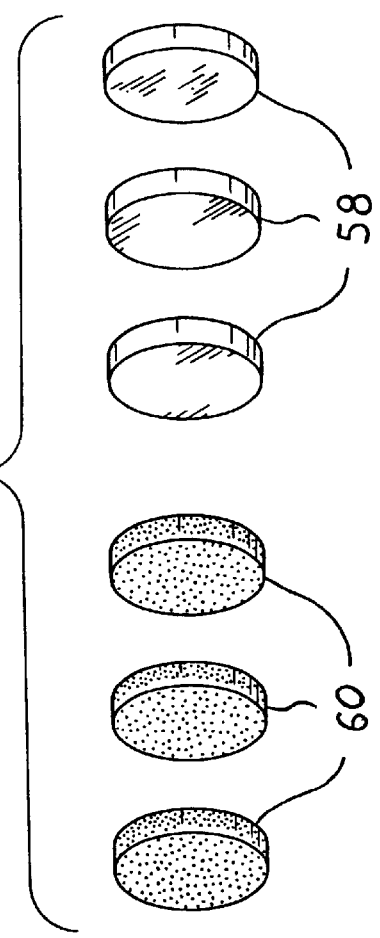

INTERCHANGEABLE SYSTEM FOR FISHING RODS

REFERENCE TO RELATED PATENT APPLICATION

This application claims the benefit of U.S. Provisional Patent Application Ser. No. 60/101,732, filed on Sep. 24, 1998.

BACKGROUND OF THE INVENTION

1. Field of the Invention

The present invention relates generally to sport fishing using rod and reel equipment, and more specifically to fishing gear having interchangeable handle components for selectively adjusting the balance, grip, handle weight and length, and other characteristics of a fishing rod for different types of fishing and fish. The present interchangeable handle components may be used with a universal rod blank, or different rod blanks may be provided, depending upon the type of fishing and fish desired.

2. Description of the Related Art

The basic fishing rod and reel have been known and used by sport anglers for a considerable period of time. As sport fishing has become more sophisticated over the years, it has become evident to the discerning angler that some modifications of equipment are important, in order to optimize the ability to catch different species of fish under different conditions. For example, certain types of fish prefer insects and the like resting on the surface of the water, while others prefer small animals (grubs, smaller fish, etc.) deeper in the water or on the bottom. Also, some fish are more attracted to live, moving prey than to dead bait.

Accordingly, different fishing styles and lures have been developed over the years, such as fly fishing (for trout, etc.) in which a lightweight fly is cast a considerable distance from the angler and left to float upon the surface. A spinning lure, which is pulled through the water by trolling from a boat or by reeling in the cast lure, is more attractive to other types of fish. Thus, the discerning angler requires different equipment (reels, lures, etc.), depending upon the type of fish and conditions in which the fishing is accomplished.

This has led to the development of interchangeable reels for fishing rods, in which a collar on the rod handle is threaded over an extended shoe of the reel, with the opposite shoe being retained in a fixed socket on the rod handle. Reels may be quickly and easily interchanged using this well known system. However, the actions of the angler are somewhat different depending upon the type of fishing being performed, weight of lure, etc. Accordingly, the exchange of one type of reel for another (casting for spinning, etc.) also requires a somewhat different action, yet the conventional rod and rod handle remain the same after this exchange of reels.

Accordingly, a need will be seen for interchangeable handle components for a fishing rod, with the different handle components providing different weights and feel, depending upon the type of fishing to be done. Moreover, the butt end of the handle may be adjustably weighted as desired in order to provide the desired feel and balance, depending upon the type of fishing to be accomplished.

In accordance with the present invention, the rod blank of the assembly is removably installable within a handle assembly, with the rod blank extending completely through the handle assembly for superior strength and interlocking security of the rod and handle components. The adjustably interchangeable weights at the butt of the handle are secured to the butt end of the fishing rod disposed therein. An additional part of the present invention comprises means to preclude any axial rotation between the rod handle and the rod blank, when the two components are assembled together.

A discussion of the related art of which the present inventor is aware, and its differences and distinctions from the present invention, is provided below.

U.S. Pat. No. 3,073,055 issued on Jan. 15, 1963 to Charles N. Edwards et al., titled "Handle For Selectively Usable Fishing Rods," describes a fishing rod handle assembly having a plurality of axially assembled components. The components may be assembled in different orders, with the component holding the reel installable at the butt end, or at some intermediate point, along the handle assembly. The butt end of the rod blank is secured within a fitting to the forwardmost handle component, and does not extend completely through the handle assembly, as in the present rod and handle assembly. Edwards et al. do not provide any means of positively locking the rod blank and handle assembly to preclude relative axial rotation of the components, as is accomplished with the present invention. Moreover, the assembly is relatively weak, due to the lack of extension of the rod through the entire handle.

U.S. Pat. No. 3,468,052 issued on Sep. 23, 1969 to Benjamin T. Hardesty et al., titled "Butt Extension For A Fishing Rod," describes a fishing rod and handle with the handle including a telescoping rearward section for extending the handle and its leverage as desired. The handle extension is a solid component, with no internal passage for the rod blank. Moreover, due to the telescoping action of the butt end of the handle, the rod blank could not extend completely therethrough, as the rod would have to extend and retract through the forward portion of the handle as the rearward extension was respectively retracted and extended. In addition, Hardesty et al. do not disclose any means of securing the rod blank to their handle to preclude any relative axial rotation.

U.S. Pat. No. 3,975,855 issued on Aug. 24, 1976 to James E. McKeown, titled "Telescopic Spin/Fly Combination Fishing Rod," describes a fishing rod having a relatively larger diameter portion which is removably installable in a handle portion. The remainder of the rod comprises a series of telescoping segments which are retractable into the larger diameter portion of the rod. The handle may be axially positioned as desired along the larger diameter portion of the rod, depending upon the type of fishing to be accomplished. However, McKeown does not provide any means for adjusting the balance of his rod assembly through counterweights, nor of positively locking the handle and rod portions to preclude relative axial rotation.

U.S. Pat. No. 4,398,369 issued on Aug. 16, 1983 to Kenneth R. Wiebe, titled "Fishing Rod Combination Having Improved Sensitivity," describes an assembly in which the rod blank passes completely through the handle, as in the present invention. However, the rearward portion of the handle is permanently affixed to the rearward end of the rod blank in the Wiebe assembly, unlike the present interchangeable handle components. Wiebe permanently affixes a finger grip or trigger to his handle assembly, with only the forward portion of the handle assembly being movable to accommodate the interchangeability of different reels. Moreover, Wiebe does not provide any counterbalance means for his assembly.

U.S. Pat. No. 4,738,046 issued on Apr. 19, 1988 to Timothy D. Fraylick et al., titled "Variable Action Fishing Rod," describes a rod handle having selectively variable flexibility. The handle itself is hollow, and includes a blade extending through the hollow center of the handle, substantially the length of the handle. As the blade is extended further into the handle, the combination of the handle and internal blade serve to stiffen the handle. No interchangeable handle components, rod extension completely through the handle, nor selectively adjustable counterweight means, are disclosed by Fraylick et al., each of which is a feature of the present invention.

U.S. Pat. No. 4,903,427 issued on Feb. 27, 1990 to Yoshiro Yamato, titled "Fishing Rod," describes a rod handle having a removable elongate telescoping plug with a fitting positioned closer to one end than the other. The plug may be removed from the remainder of the handle and turned around, with the plug extending a greater or lesser distance from the handle, depending upon which way the plug is turned to position the fitting adjacent the remainder of the handle. The fishing rod blank cannot extend completely through the handle in the Yamato fishing rod, due to the closed ends on the plug. Moreover, Yamato makes no provision for counterbalancing the rod and handle assembly, nor for positively locking the two handle components to one another to preclude relative axial rotation thereof, which features are provided for by the present invention.

U.S. Pat. No. 5,259,140 issued on Nov. 9, 1993 to Frank E. Epperson, titled "Telescoping Fishing Rod Assembly," describes a telescoping rod assembly similar to the telescoping rod assembly of the McKeown '855 U.S. Patent discussed further above. Epperson provides a removable handle which may be turned around end for end to adjust the length of the handle assembly, somewhat like the Yamato '427 U.S. Patent discussed immediately above. As in the Yamato fishing rod, Epperson does not provide any means for adjusting the balance of his rod by means of adjustable counterweights, nor does he provide for the insertion of the base of the rod completely through the handle assembly, as provided by the present invention.

U.S. Pat. No. 5,263,275 issued on Nov. 23, 1993 to James T. Rumbaugh, titled "Variable Circumference Rod Handle," describes a rod handle having adjustable radial expansion means therein, with the expansion means being adjustably controlled by a threaded adjustment in the butt of the handle. The rod blank cannot extend completely through the handle, due to the handle circumference adjustment means disposed in the butt of the handle. This also precludes provision for any removably adjustable counterweighting of the butt end of the handle, as provided by the present invention.

U.S. Pat. No. 5,291,683 issued on Mar. 8, 1994 to Yoshiro Yamato, titled "Fishing Rod," describes a threaded collar assembly disposed rearwardly of the rearward reel shoe socket or receptacle. The threaded collar assembly is threaded toward the forward tip of the rod to secure the reel to the rod, with the front shoe of the reel extending beneath a fixed socket or receptacle. Yamato does not disclose any counterbalance means for his rod assembly, nor any means for positively precluding axial rotation of the handle assembly about the rod, as provided by the present invention.

U.S. Pat. No. 5,535,539 issued on Jul. 16, 1996 to Bruce A. Vetre, titled "Fishing Rod Handle With Extension," describes a fishing rod with replaceable handle components for adjusting the overall length of the rod and handle assembly. Vetre provides different handle components which are interchangeably threaded onto the forward portion of the handle, which in turn is secured to the rod blank. Vetre also provides interchangeable counterbalance plugs, which fit into the butt end of the handle extension which has been interchangeably secured to the forward handle portion of his fishing rod. In contrast, the present rod provides complete handles, which may be installed interchangeably to a fishing rod blank. The rod blank extends completely through the handle, with the interchangeable counterweight being threadedly attached to the butt end of the rod blank at the butt end of the handle, in the present invention. The resulting assembly of the present invention is much more solid and secure than the multi piece Vetre handle and counterweight plug.

German Patent Publication No. 2,256,306 published on Jun. 7, 1973 to Elisabeth Jung et al., illustrates a structure for securing the butt end of a fishing rod blank into a handle assembly. No interchangeable handle assemblies are apparent in the German Patent Publication, and the rod blank does not extend completely through the entire handle assembly, as provided in the present invention. Also, no means is apparent in the German Patent Publication for positively locking the rod blank relative to the handle, to preclude relative axial rotation between the components, nor is any means apparent to provide for any counterweighting of the assembly, as provided by the present invention.

British Patent Publication No. 2,032,743 published on May 14, 1980 to Ian Gillespie, titled "Fishing Rod," describes a rod handle assembly which functions similarly to that described in the '052 U.S. Patent to Hardesty et al., discussed further above. However, rather than threading the extension into the butt of the handle, as in the case of Hardesty et al., the device of the British Patent Publication utilizes an eccentric arrangement to jam the telescoping components together at the desired extended position. The rod blank does not extend completely through the handle components, nor is any means disclosed for the removable installation of adjustable counterweights, which features are provided in the present invention.

Finally, British Patent Publication No. 2,131,261 published on Jun. 20, 1984 to Mann Aviation Ltd., titled "Fishing Accessory," describes a telescoping handle end having an elastic collet disposed within the outer handle portion. A threaded assembly may be used to compress the collet axially, causing it to expand radially to lock the extension at the desired position. The assembly does not allow the rod blank to extend completely through the handle assembly, nor is any disclosure made of removable attachment of counterweights to the butt end of the handle, which features are a part of the present invention.

None of the above inventions and patents, either singly or in combination, is seen to describe the instant invention as claimed.

SUMMARY OF THE INVENTION

The present invention comprises a fishing rod assembly and handle assembly, with the assembly including handle components which may be interchangeably installed to a rod blank. Different rod blanks may also be used with the handle assembly of the present invention.

The handle assembly includes a rod blank passage formed axially therethrough, with the passage closely fitting about a rod blank inserted therethrough for maximum strength of the assembly. The rod blank includes counterweight attachment means, such as a threaded ferrule and threaded insert, installed upon its butt end. The butt end of the rod blank extends through the butt end of the handle assembly to provide for the interchangeable installation of a counterweight thereto. The rod blank adjacent the forward end of the handle assembly includes a fitting immovably secured thereto, which fits into a cooperating socket in the forward end of the handle to preclude axial rotation between the rod blank and handle assembly. The handle assembly may interchangeably accept different types of fishing reels as desired, and the counterweight may be interchanged as desired, or may have different amounts of weight added thereto or removed therefrom as desired.

Accordingly, it is a principal object of the invention to provide an improved fishing rod and handle assembly, with the handle assembly including an axial passage therethrough for the closely fitting and removable installation of a fishing rod blank interchangeably therein.

It is another object of the invention to provide an improved fishing rod and handle assembly, with the handle assembly including means for removably and interchangeable installing different fishing reels and/or a finger grip thereto, as desired.

It is a further object of the invention to provide an improved fishing rod and handle assembly, including removable and interchangeable counterweight means disposed at the butt end of the handle assembly.

An additional object of the invention is to provide an improved fishing rod and handle assembly, with the rod blank including means for precluding relative axial rotation between the rod blank and the handle assembly, and further including means for securing the counterweight means to the butt end of the rod blank protruding from the butt end of the handle assembly when the rod blank and handle assembly are assembled together.

Still another object of the invention is to provide an improved fishing rod and handle assembly which counterweight means provides for the adjustment of the amount of weight therein, as desired.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is an exploded perspective view of the counterweight assembly of the present invention, showing various details thereof.

FIG. 3 is a cross section elevation view through the forward end of the handle assembly with the rod blank assembled therewith, showing the details of the keyed fittings between the handle and rod blank for precluding relative axial rotation therebetween.

Similar reference characters denote corresponding features consistently throughout the attached drawings.

DETAILED DESCRIPTION OF THE PREFERRED EMBODIMENT

Figure 1:
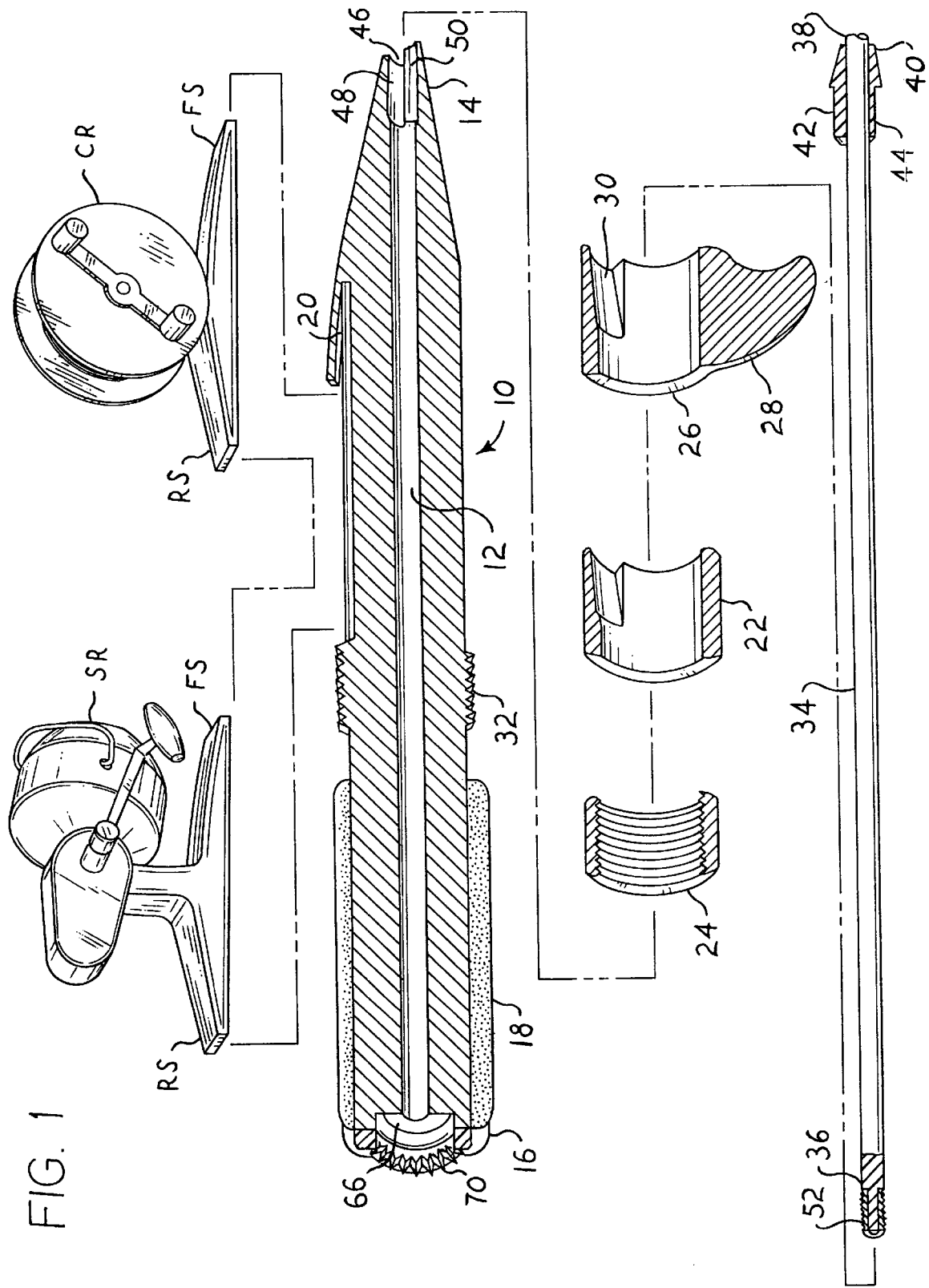
FIG. 1 is an exploded perspective view in section of the handle assembly and rearward portion of the rod blank interchangeable installable therewith, showing various details thereof.

The present invention comprises various interchangeable handle components for a fishing rod, generally as shown in the exploded sectional view of FIG. 1. The various components include a handle assembly 10, which generally comprises a round, elongate, handle structure having a rod blank passage 12 formed axially and concentrically therethrough, and extending completely through the handle assembly 10 from its forward end 14 to its opposite rearward or butt end 16. The handle assembly 10 may include a padded or cushioned grip 18 extending forwardly from the butt end 16, if so desired.

Alternate, preferred constructions of handle 10 are that it is formed as a blow-molded or extruded (for example) shell, or shell halves, ultrasonically welded together, with sufficient wall thickness to be shape retaining, with an expansive hollow interior, thus to conserve material needed to form the handle 10.

The handle assembly 10 also includes a forward seat or receptacle 20 for securing the conventional forward shoe FS of a conventional fishing reel therein, such as the fly casting reel CR or the spinning reel SR shown in FIG. 1. The opposite rearward shoe RS of the reels CR or SR is secured in place by a reel securing collar 22, which is in turn urged forwardly over the rear shoe RS of the installed reel by a second threaded collar 24. The two collars 22 and 24 may be installed on the handle 10 by passing them in the appropriate order over the forward end 14 of the handle 10, and then rearwardly along the handle 10 and into position. Collar 22 is installed for certain types of fishing, most notably for fly casting.

It will be seen that different reel securing collars may be installed upon the handle assembly 10, by using the above described assembly procedure. FIG. 1 also shows an alternative reel attachment collar 26, with the second collar 26 including an elongate finger grip with a removable trigger 28 extending generally radially therefrom, and opposite the seat 30 for the rear shoe RS of the reel. The present handle assembly 10 provides for the interchangeability of the reel securing collars 22 or 26 along with the desired reel CR or SR, according to the type of fishing to be accomplished. Either collar 22 or 26 is urged forwardly into position to sandwich the reel CR or SR, by means of the threaded collar 24 and mating threaded portion 32 of the handle 10.

The flexible, elongate, generally cylindrical rod blank 34 is configured to fit within the rod blank passage 12 of the handle assembly. The butt end 36 of the rod blank 34 is inserted into the forward end of the rod blank passage 12, and passed rearwardly through the passage 12 until the butt end 36 of the rod blank 34 extends slightly beyond the butt end 16 of the handle assembly 10. This configuration provides for the removable and interchangeable attachment of various counterweight assemblies to the butt ends 16 and 36 respectively of the handle assembly 10 and rod blank 34, as will be described in detail further below.

The intermediate portion 38 of the rod blank 34, i. e., that portion of the rod blank 34 disposed at the forward end 14 of the handle assembly 10 when the handle assembly 10 and rod blank assembly 34 are assembled together, includes means for securing the rod blank assembly 34 and handle assembly 10 together. A notched sleeve 40 is permanently and immovably affixed (by a conventional adhesive, or other suitable means) to the intermediate portion 38 of the rod blank 34. This sleeve 40 includes a portion with a larger diameter 42 and an opposite smaller diameter 44. The forward end 14 of the handle assembly 10 includes a mating socket 46 formed therein, with the socket 46 comprising a larger diameter portion 48 and opposite smaller diameter portion 50. Thus, the sleeve 40 affixed to the rod blank assembly 34 keys or fits precisely into the socket 46 of the forward end 14 of the handle assembly 10, to preclude any relative axial rotation between the two components. This configuration is shown in cross section in FIG. 3.

The present interchangeable assembly also includes means for interchanging different counterweights at the butt end 16 of the handle assembly 10. As noted further above, the butt end 36 of the rod blank assembly 34 extends slightly beyond the butt end 16 of the handle assembly 10, when the rod blank assembly 34 is installed completely through the handle assembly 10. (The mating sleeve 40 of the rod blank 34 and socket 46 of the forward end 14 of the handle assembly 10, preclude further rearward movement of the rod blank 34 through the handle assembly 10.) The butt end 36 of the rod blank assembly 34 includes counterweight attachment means comprising a threaded ferrule and/or insert 52 permanently and immovably affixed thereto (e.g., by means of a suitable conventional adhesive, or other suitable means), with the counterweight means described below, including conventional mating threaded attachment therein (not shown) providing for the removable attachment of the counterweight means to the butt end 36 of the rod blank 34, and thus to the butt end 16 of the handle assembly 10.

The counterweight means of FIG. 2 comprises a hollow, generally spherical knob 54, with the hollow interior 56 providing room for the interchangeable installation of various different counterweights 58 therein. Weights 58 may be formed of materials of different densities (plastic, aluminum, steel, lead, etc.), and/or may be of different thicknesses to provide the different combinations of counterweights as desired. One or more cushions 60 may be provided to preclude any looseness of the weight(s) 58 when installed within the counterweight knob 54. A threaded cap 62 may be used to close the interior 56 of the counterweight knob 54.

The forward end of the counterweight knob 54 includes a concentric base 64, which fits closely within a mating concentric seat 66 (FIG. 1) formed in the butt end 16 of the handle assembly 10. The base 64 of the counterweight knob 54 and the mating seat 66 of the butt end 16 of the handle assembly 10, each include mating resilient serrations or the like radially disposed about mating permanently attached washers, respectively 68 and 70. The serrated washers 68 and 70 engage one another when the counterweight knob 54 is secured to the mating ferrule 52 of the butt end 36 of the rod blank assembly 34, to preclude inadvertent detachment of the counterweight knob from the remainder of the assembly. Yet, the resilient serrations of the two washers 68 and 70 allow the counterweight knob 54 to be unscrewed from the mating ferrule 52 of the butt end 36 of the rod blank assembly 34, as desired. Alternatively, the counterweight knob 54 may be formed as a solid component of any of a variety of materials of different densities (plastic, metal, marble or other stone, etc.), to provide for the interchangeability of different weights as desired for the type of fishing to be done.

In summary, the present invention permits a fishing rod assembly to be customized for different types of fishing, without the angler being required to purchase a complete different rod, reel, and handle assembly for each different type of fishing to be performed. The present handle assembly is adaptable for receiving virtually any rod blank from a variety of commercial manufacturers, with no modification to the blanks being required other than the installation of the counterweight attachment ferrule and sleeve.

When an angler wishes to adapt the present rod, reel, and handle assembly from one type of fishing to another, he or she need only remove the counterweight assembly from the butt end of the rod blank assembly and handle assembly, thereby allowing the rod blank assembly to be removed from the handle assembly. The threaded reel attachment collar is then loosened, to permit the rearward reel retaining collar to be moved rearwardly for the removal of the reel, if necessary. A different reel may then be installed by reversing the above process, with the angler perhaps also installing a different rod blank having different characteristics (length, flexibility, etc.), depending upon the type of fishing to be done. Finally, a counterweight having the desired mass characteristics is secured to the butt end of the rod blank assembly protruding from the butt end of the handle assembly, and/or different weights are installed or replaced within the counterweight knob, as desired, in order to complete the customizing of the assembly as desired. In the event that a rod blank assembly is broken or damaged, the present invention permits the economical replacement of only the rod blank assembly, without need to purchase an entire rod and handle assembly. The present interchangeable assembly will be seen to provide an economical means of allowing anglers to pursue any of a number of different types of fishing as desired, without need to purchase a separate rod, reel, and handle assembly for each type of fishing.

It is to be understood that the present invention is not limited to the sole embodiment described above, but encompasses any and all embodiments within the scope of the following claims.

I claim:

1. Interchangeable components for a fishing rod, comprising:

a rod blank comprising an elongate, generally cylindrical, flexible structure;

a handle assembly comprising a generally round, elongate structure having a rod blank passage formed axially and concentrically completely therethrough, for removably and interchangeably fitting closely about said rod blank;

said rod blank and said handle assembly each having a butt end, with said butt end of said rod blank protruding slightly from said butt end of said handle assembly when said rod blank and said handle assembly are secured together;

counterweight means; and said rod blank including counterweight attachment means permanently affixed to said butt end thereof, for removably securing said counterweight means to said rod blank, said handle assembly including counterweight attachment means on said butt end, and said counterweight means comprising a counterweight knob having a base, said counterweight attachment means on said butt end of said handle assembly and said base of said counterweight knob each including mating resilient serrations radially disposed about a mating permanently attached washer for engaging one another when said counterweight knob is secured to said butt end of said rod blank, for precluding inadvertent detachment of said counterweight knob from said handle assembly.

2. The interchangeable components for a fishing rod according to claim 1, wherein said handle assembly and said rod blank each include cooperating means for removably affixing said rod blank within said handle assembly and for precluding axial rotation of said rod blank relative to said handle assembly when said rod blank is assembled with said handle assembly.

3. The interchangeable components for a fishing rod according to claim 2, wherein said cooperating means for removably affixing said rod blank within said handle assembly and for precluding axial rotation of said rod blank relative to said handle assembly, comprises:

said rod blank having an intermediate portion with a notched sleeve permanently and immovably affixed thereto;

said sleeve having a first portion with a large diameter and a second portion with a small diameter opposite said first portion;

said handle assembly having a forward end with a socket formed therein;

said socket having a first portion with a large diameter for fitting with said large diameter of said first portion of said sleeve, and a second portion with a small diameter opposite said first portion for fitting with said small diameter of said second portion of said sleeve and precluding any relative axial rotation between said rod blank and said sleeve.

4. The interchangeable components for a fishing rod according to claim 1, wherein said counterweight means is adjustable for varying the weight thereof.

5. The interchangeable components for a fishing rod according to claim 4, wherein said adjustable counterweight means comprises a hollow counterweight knob removably secured to said butt end of said handle assembly and a plurality of weights for removably installing within said counterweight knob as desired.

6. The interchangeable components for a fishing rod according to claim 5, wherein said adjustable counterweight means includes at least one cushion for removably installing within said counterweight knob as desired for precluding shifting of said weights therein.

7. The interchangeable components for a fishing rod according to claim 1, including a trigger removably attached to said handle assembly.

8. The interchangeable components for a fishing rod according to claim 1, including cushioned grip means disposed upon said handle assembly.

9. Interchangeable components for a fishing rod, comprising:

a rod blank comprising an elongate, generally cylindrical, flexible structure;

a handle assembly comprising a generally round, elongate structure having a rod blank passage formed axially and concentrically completely therethrough, for removably and interchangeably fitting closely about said rod blank;

said rod blank and said handle assembly each having a butt end, with said butt end of said rod blank protruding slightly from said butt end of said handle assembly when said rod blank and said handle assembly are secured together;

counterweight means; and said handle assembly and said rod blank including cooperating means for removably affixing said rod blank within said handle assembly and for precluding axial rotation of said rod blank relative to said handle assembly when said rod blank is assembled with said handle assembly; and a counterweight attachment means permanently affixed to said butt end of said rod blank, for removably securing said counterweight means to said rod blank, said handle assembly including counterweight attachment means on said butt end, and said counterweight means comprising a counterweight knob having a base, said counterweight attachment means on said butt end of said handle assembly and said base of said counterweight knob each including mating resilient serrations radially disposed about a mating permanently attached washer for engaging one another when said counterweight knob is secured to said butt end of said rod blank, for precluding inadvertent detachment of said counterweight knob from said handle assembly.

10. The interchangeable components for a fishing rod according to claim 9, wherein said cooperating means for removably affixing said rod blank within said handle assembly and for precluding axial rotation of said rod blank relative to said handle assembly, comprises:

said rod blank having an intermediate portion with a notched sleeve permanently and immovably affixed thereto;

said sleeve having a first portion with a large diameter and a second portion with a small diameter opposite said first portion;

said handle assembly having a forward end with a socket formed therein;

said socket having a first portion with a large diameter for fitting with said large diameter of said first portion of said sleeve, and a second portion with a small diameter opposite said first portion for fitting with said small diameter of said second portion of said sleeve and precluding any relative axial rotation between said rod blank and said sleeve.

11. The interchangeable components for a fishing rod according to claim 9, wherein said counterweight means is adjustable for varying the weight thereof.

12. The interchangeable components for a fishing rod according to claim 11, wherein said adjustable counterweight means comprises a hollow counterweight knob removably secured to said butt end of said handle assembly and a plurality of weights for removably installing within said counterweight knob as desired.

13. The interchangeable components for a fishing rod according to claim 12, wherein said adjustable counterweight means includes at least one cushion for removably installing within said counterweight knob as desired for precluding shifting of said weights therein.

14. The interchangeable components for a fishing rod according to claim 9, including a trigger removably attached to said handle assembly.

15. The interchangeable components for a fishing rod according to claim 9, including cushioned grip means disposed upon said handle assembly.

* * * * *